(12) United States Patent
Andreasen

(10) Patent No.: US 7,953,867 B1
(45) Date of Patent: May 31, 2011

(54) SESSION DESCRIPTION PROTOCOL (SDP) CAPABILITY NEGOTIATION

(75) Inventor: Flemming Stig Andreasen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 627 days.

(21) Appl. No.: 11/668,334

(22) Filed: Jan. 29, 2007

Related U.S. Application Data

(60) Provisional application No. 60/864,916, filed on Nov. 8, 2006.

(51) Int. Cl.
*G06F 15/16* (2006.01)
(52) U.S. Cl. ........ 709/228; 709/203; 709/220; 709/227; 709/230
(58) Field of Classification Search .......... 709/202–203, 709/220–221, 227–230
See application file for complete search history.

(56) References Cited

U.S. PATENT DOCUMENTS

| | | | | |
|---|---|---|---|---|
| 6,363,421 B2 * | 3/2002 | Barker et al. | ................. | 709/223 |
| 7,142,537 B2 * | 11/2006 | Shores et al. | ................. | 709/228 |
| 7,227,865 B2 * | 6/2007 | Shaheen et al. | ............... | 370/230 |
| 7,243,365 B1 * | 7/2007 | Rahman | ........................ | 725/109 |
| 7,467,220 B2 | 12/2008 | del Val et al. | | |
| 7,468,983 B2 * | 12/2008 | Requena et al. | ............. | 370/401 |
| 7,512,118 B1 * | 3/2009 | Stephens | ....................... | 370/352 |
| 7,702,760 B2 * | 4/2010 | Latvakoski et al. | ........... | 709/220 |
| 7,788,383 B2 * | 8/2010 | Andreasen | .................... | 709/228 |
| 2005/0117580 A1 | 6/2005 | del Val et al. | | |
| 2007/0078986 A1 | 4/2007 | Ethier et al. | | |
| 2007/0276947 A1 * | 11/2007 | Panattu et al. | ................ | 709/227 |
| 2008/0080568 A1 | 4/2008 | Hughes et al. | | |
| 2008/0285487 A1 * | 11/2008 | Forslow et al. | ............... | 370/277 |
| 2009/0262915 A1 | 10/2009 | Wu et al. | | |
| 2009/0274146 A1 | 11/2009 | Zhu | | |
| 2009/0290573 A1 | 11/2009 | Belling et al. | | |

OTHER PUBLICATIONS

Andreasen, F., "Session Description Protocol Security Descriptions for Media Streams <draft-ietf-mmusic-sdescriptions-12.txt>", *MMUSIC, Working Group, Internet-Draft*, (Sep. 2005), 37 pgs.
Andreasen, F., "Session Description Protocol (SDP) Simple Capability Declaration", *Networking Working Group*, Request for Comments: 3407, (Oct. 2002), 10 pgs.
Baugher, M., "The Secure Real-Time Transport Protocol (SRTP)", *Network Working Group*, Request for Comments: 3711, (Mar. 2004), 54 pgs.
Bradner, S., "Key Words for Use in RFCs to Indicate Requirement Levels", *Network Working Group*, Request for Comments: 2119, (Mar. 1997), 3 pgs.
Camarillo, G., et al., "Grouping of Media Lines in the Session Description Protocol (SDP)", *Network Working Group*, Request for Comments: 3388, (Dec. 2002), 20 pgs.

(Continued)

*Primary Examiner* — Bharat N Barot
(74) *Attorney, Agent, or Firm* — Schwegman, Lundberg & Woessner, P.A.

(57) ABSTRACT

In an example embodiment a method is provided which comprises initiating at an offerer endpoint an offer message in Session Description Protocol (SDP) format. Included in the offer message is an indication of a plurality of potential configurations which the offerer endpoint is capable of supporting. The offer message is sent to an answerer endpoint to allow capability negotiation between the offerer endpoint and the answerer endpoint in a manner that is backwards compatible with existing endpoints. In an example embodiment, the indication of the plurality of potential configurations comprises assigning a new attribute or value to an existing type of SDP identifier.

29 Claims, 5 Drawing Sheets

OTHER PUBLICATIONS

Camarillo, G., et al., "The Alternative Network Address Types (ANAT) Semantics for the Session Description Protocol (SDP) Grouping Framework", *Network Working Group*, Request for Comments: 4091 (Jun. 2005), 7 pgs.

Crocker, D., et al., "Augmented BNF for Syntax Specifications: ABNF", *Network Working Group*, Request for Comments: 2234, (Nov. 1997),17 pgs.

Crocker, D., et al., "Augmented BNF for Syntax Specifications: ABNF", *Network Working Group*, Request for Comments: 4234, (Oct. 2005),16 pgs.

Freed, N., et al., "Multipurpose Internet Mail Extensions (MIME) Part Two: Media Types", *Networking Working Group*, Request for Comments: 2046, (Nov. 1996), 43 pgs.

Handley, M., et al., "SDP: Session Description Protocol", *Network Working Group*, Request for Comments: 4566, (Jul. 2006), 52 pgs.

Handley, M., et al., "SDP: Session Description Protocol", *Network Working Group*, Request for Comments: 2327, (Apr. 1998), 40 pgs.

Huitema, C., "Real Time Control Protocol (RTCP) Attribute in Session Description Protocol (SDP)", *Network Working Group*, Request for Comments: 3605, (Oct. 2003), 8 pgs.

Jennings, C., et al., "Session Initiation Protocol (SIP) Offer/Answer With Multipart Alternative <draft-jennings-sipping-multipart-02>", *Network Working Group*, Internet-Draft, (Mar. 5, 2006), 14 pgs.

Kutscher, et al., "Session Description and Capability Negotiation", *Internet-Draft*, draft-ietf-mmusic-sdpng-08.txt, (Feb. 20, 2005), 58 pgs.

Ott, J., et al., "Extended RTP Profile for RTCP-Based Feedback (RTP/AVPF)", *Internet-Draft*, draft-ietf-avt-rtcp-feedback-11.txt, (Aug. 10, 2004), 50 pgs.

Ott, J., et al., "Extended Secure RTP Profile for RTCP-Based Feedback (RTP/SAVPF)", *Internet-Draft*, draft-ietf-avt-profile-savpf-05.txt, (Dec. 2005), 18 pgs.

Ramsdell, B., "Secure/Multipurpose Internet Mail Extensions (S/MIME) Version 3.1 Message Specification", *Network Working Group*, Request for Comments: 3851, (Jul. 2004), 35 pgs. Rosenberg, J., et al., "An Offer/Answer Model With the Session Description Protocol (Sdp)", Network Working Group, Request for Comments: 3264, (Jun. 2002), 24 pgs.

Rosenberg, J., et al., "An Offer/Answer Model With the Session Description Protocol (SDP)", *Network Working Group*, Request for Comments: 3264, (Jun. 2002), 24 pgs.

Rosenberg, J., et al., "SIP: Session Initiation Protocol", *Network Working Group*, Request for Comments: 3261, (Jun. 2002), 272 pgs.

Schulzrinne, H., et al., "RTP Profile for Audio and Video Conferences With Minimal Control", *Network Working Group*, Request for Comments: 3551, (Jul. 2003), 42 pgs.

International Application No. PCT/US2008/080872,International Search Report mailed Jul. 28, 2009, 5 pgs.

Andreasen, "SDP Capability Negotiation", http://tools.ietf.org/html/draft-ietf-mmusic-sdp-capability-negotiation-01, (Jan. 28, 2007), 30 pgs.

Camarillo, et al., "Integration of Resource Management and Session Initiation Protocol (SIP)", http://www.apps.ietf.org/rfc/rfc3312.html, (Oct. 2002), 23 pgs.

Kaplan, et al., "Session Description Protocol (SDP) Offer/Answer Negotiation for Best-Effort Secure Real-Time Transport Protocol", http://209.85.165.104/u/ietf?q=cache:QKPISDHO6rYJ:tools.ietf.org/w..., 9 pgs.

Rosenberg, et al., "An Offer/Answer Model with the Session Description Protocol (SDP)", http://www.ieff.org/rfc/rfc3264.txt, (Jun. 2002), 21 pgs.

Rosenberg, "Interactive Connectivity Establishment (ICE): A Methodology for Network Address Translator (NAT) Traversal for Offer/Answer Protocols", http://tools/ietf.org/html/draft-ietf-mmusic-ice-13, (Jan. 16, 2007), 82 pgs.

\* cited by examiner

SESSION DESCRIPTION PROTOCOL (SDP) CAPABILITY NEGOTIATION

RELATED APPLICATIONS

This patent application claims the benefit of priority, under 35 U.S.C. Section 119(e), to U.S. Provisional Patent Application Ser. No. 60/864,916, filed Nov. 8, 2006, the entire content of which is incorporated herein by reference

FIELD

This application relates to negotiating streaming, conversational and other forms of media streams and, in an example embodiment, it relates to using SDP (Session Description Protocol) for capability negotiation during initialization of sessions.

BACKGROUND

When initiating a media stream session, for example multimedia teleconferences, voice-over-IP calls, streaming video and/or audio, there is a need to convey session information, for example media details, addresses, or other session description information, to the participants of the session.

SDP is a format or protocol for describing media stream initialization parameters. SDP is not in itself a transport protocol and is purely for session description, irrespective of how the streaming media is to be transported.

Simply providing media stream descriptions is sufficient for session announcements in a broadcast application, where the media stream parameters are fixed for all participants. When a participant wants to join the session, he/she obtains the session announcement and uses the media descriptions provided, e.g., joining a multicast group and receiving media packets in the encoding format specified. If the media stream description is not supported by the participant, he is unable to receive the media.

Such restrictions are not generally acceptable to multimedia session invitations, where two or more entities attempt to establish a media session using a set of media stream parameters acceptable to all participants. Firstly, each entity must inform the other of its details, e.g. receive address, and secondly, the entities need to agree on the media stream parameters to use for the session, e.g. transport protocols and codecs. A distinction is made between the capabilities supported by each participant and the media stream parameters that are actually used for the session.

SDP is intended to be general-purpose so that it can be used in a wide range of network environment and applications. However RFC 2327 and its update RFC 4566, an Internet Proposed Standard document which defines SDP is not defined to support negotiation of session content or media encodings.

RFC 3264, the offer/answer model, defines a limited session negotiation model for use with SDP, however, there is currently no well-defined way to: negotiate alternative transport protocols (e.g. RTP profiles such as RTP/AVP and RTP/SAVP); negotiate alternative combinations of transport protocols and media types (e.g. RTP/AVP and "audio" for voice-band data or T.38 and "image" for fax relay); negotiate alternative media formats (e.g. codecs) without committing to use all of them at the same time (e.g. indicating support of PCMU and G.729 would indicate that either can be used with a switch on-the-fly based on observed payload type only); or negotiate unicast and multicast addresses as alternative transport addresses.

BRIEF DESCRIPTION OF DRAWINGS

Embodiments are illustrated by way of example and not limitation in the accompanying drawings, in which like references indicate similar elements and in which.

DESCRIPTION OF EXAMPLE EMBODIMENTS

In the following description, for purposes of explanation, numerous specific details are set forth in order to provide a thorough understanding of example embodiments.

Overview

In one example embodiment, there is provided a method which comprises use of SDP not only for session initiation or description, but also for session capability negotiation. In particular, the method comprises using SDP to disclose not only actual media stream configurations which an endpoint is currently supporting, but additionally media stream capabilities, or potential configurations, which an endpoint is capable of supporting. The method may further comprise negotiating or selecting one configuration from the potential configurations, which is compatible with two or more endpoints.

Example Embodiments

Figure 1:
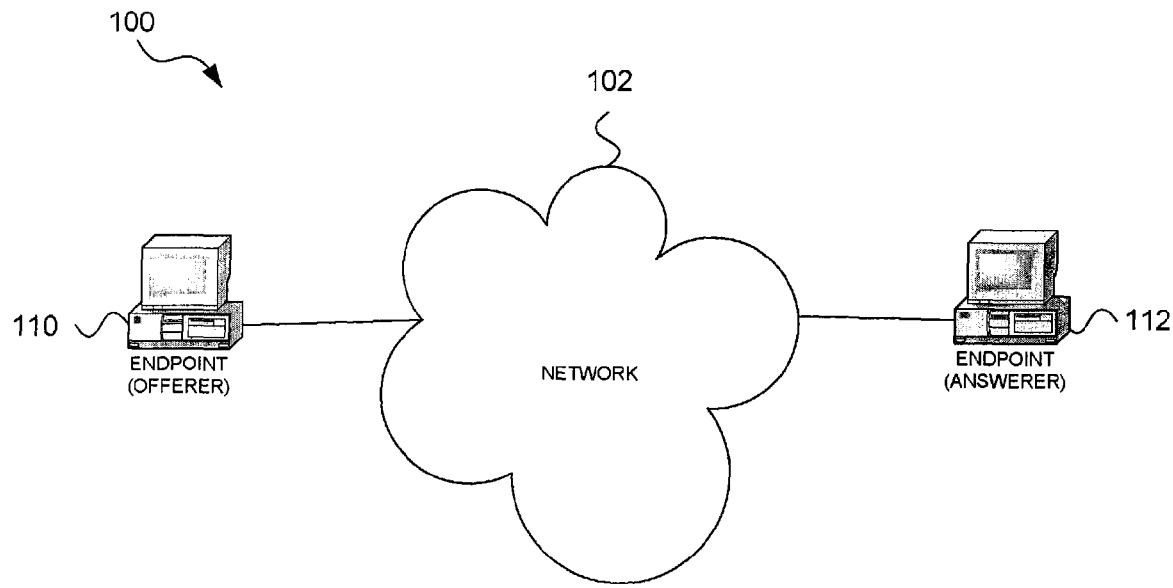
FIG. 1 shows a schematic representation of a system, in accordance with an example embodiment, which is operable to use SDP for session capability negotiation.

FIG. 1 shows a system 100, in accordance with an example embodiment, to initiate and negotiate a media stream session and which is operable to use SDP not only for session initiation, but also for session capability negotiation;

The system 100 is shown to include a network 102 which may be a wide area network, for example the Internet, a local area network, or the like. The system 100 further comprises at least two endpoints 110, 112 which may be any communication device capable of sending and/or receiving a media stream. For example, the endpoints 110, 112 may be in the form of computers, e.g. computer servers or terminals, mobile communication devices, such as PDAs (Personal Digital Assistants) or mobile telephones, or the like. For ease of reference, one endpoint 110 is referred to as an offerer endpoint and the other endpoint 112 is referred to as the answerer endpoint. Thus, the offerer endpoint 110 may send the first SDP message (an offer or initiating message) and the answerer endpoint 112 may respond by sending an answer SDP message back to the offerer endpoint 110. Although only two endpoints 110, 112 are illustrated, it is to be appreciated that the system 100 may include any number of endpoints.

Figure 2:
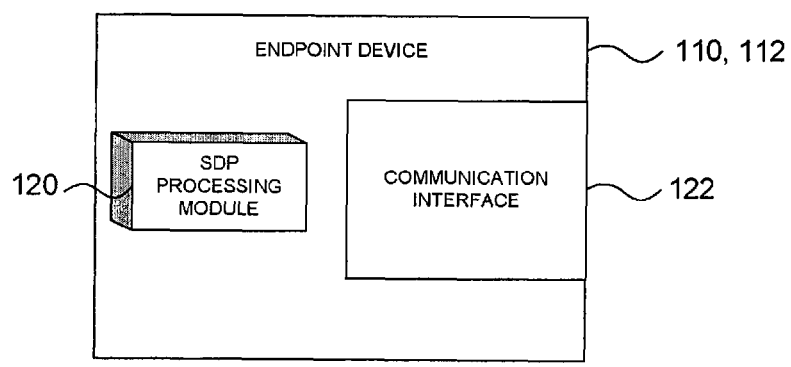
FIG. 2 shows a schematic representation of a device, in accordance with the example embodiment of FIG. 1, which is operable to use SDP for session capability negotiation.

Referring now also to FIG. 2, the endpoints 110, 112 are shown in more detail in the example form of an endpoint device. For ease of description, the endpoints 110, 112 are shown to be similar, but it is to be appreciated that they could well have different hardware configurations. It will be appreciated that each endpoint 110, 112 is not necessarily consolidated into one device, and may be distributed among a number of devices. Each endpoint 110, 112 may comprise at least one conceptual module, which corresponds to a functional task performed by the endpoint 110, 112. More specifically, in an example embodiment each endpoint 110, 112 comprises a SDP processing module 120 which is operable to generate a message (e.g. an offer message) based on the configuration of the endpoint 110, 112 and/or which is operable to interpret an incoming message (e.g. an offer message) and in response thereto, generate a response message (e.g. an answer message).

It is to be understood that each SDP processing module 120 may be operable to recognize the various potential configurations which an endpoint 110, 112 is capable of supporting. This may be done, for example, by having the potential configurations pre-stored in the SDP processing module 120 or other storage device. Instead, the SDP processing module 120 may be operable to interrogate the endpoint 110, 112, to determine the potential configurations in which the endpoint 110, 112 is capable of communicating.

Each endpoint 110, 112 further includes a communication interface 122, which is operable, among other things, to send and to receive messages. Thus, depending on the function which the endpoint 110, 112 is busy performing, the communication interface 122 may act either as a sending arrangement or a receiving arrangement, or as both.

Potential configurations or capabilities may include transport protocols (as defined by SDP and covering aspects like RTP profiles), transport addresses, media types, media format (e.g. codecs), and attributes (e.g. keying material).

Figure 3A:
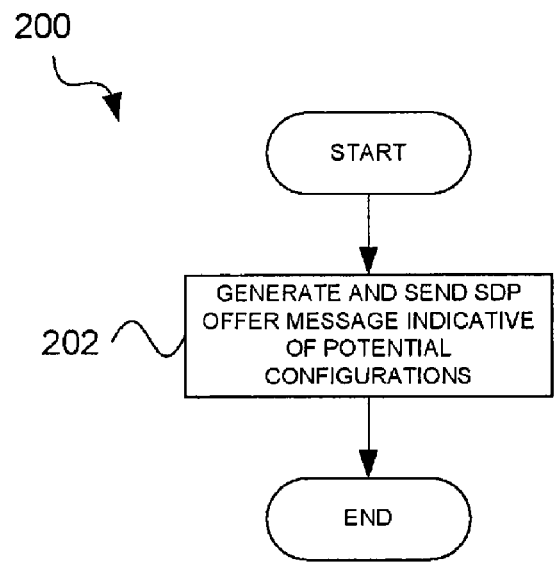
FIGS. 3*a* and 3*b* show, in high-level flow diagram form, examples of methods for SDP session negotiation in the example systems of FIGS. 1 and 2.
Figure 3B:
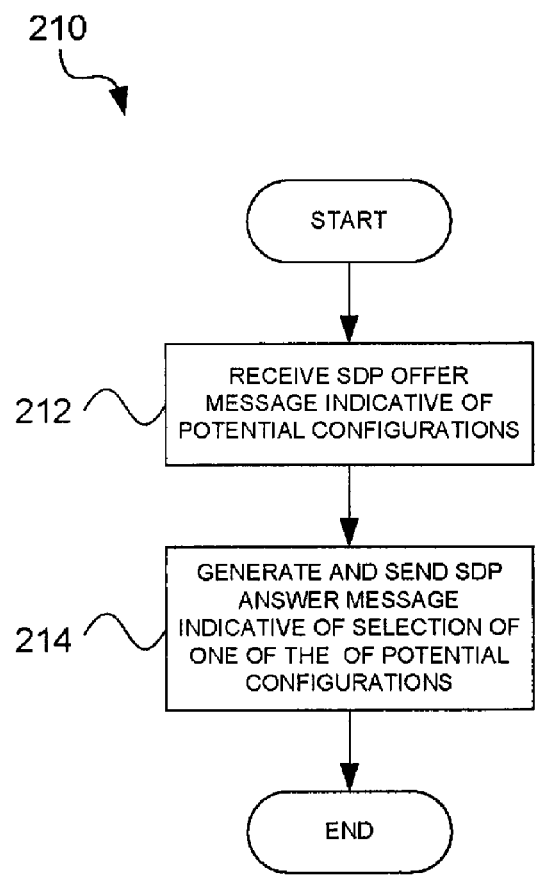
Figure 3C:
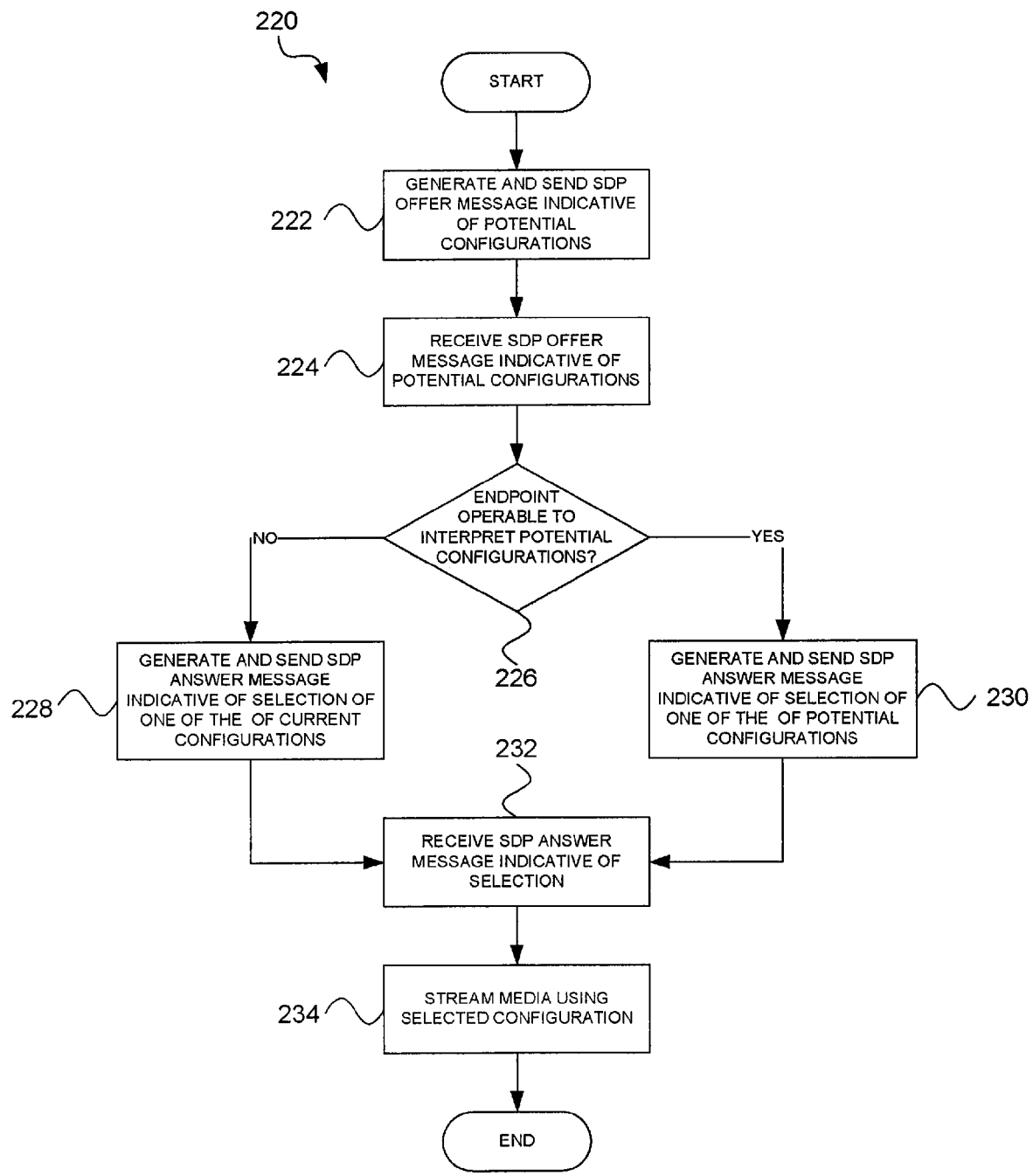
FIG. 3*c* shows, in an interaction diagram form, an example of a method for SDP session negotiation in the example systems of FIGS. 1 and 2.

Example embodiments will now be further described in use with reference to FIGS. 3a to 3c. FIG. 3a shows a high-level flow diagram of a method 200, in accordance with an example embodiment, for SDP-based session negotiation. The method 200 comprises generating and sending, at block 202, an offer message in Session Description Protocol (SDP) format, the offer message comprising a current configuration (also known as an actual configuration) as well as an indication of a plurality of potential configurations or capabilities which an offerer endpoint is capable of supporting.

FIG. 3b shows a high-level flow diagram of a method 210, in accordance with an example embodiment, for SDP-based session negotiation. The method 210 comprises receiving, at block 212, an offer message in SDP format, the offer message comprising an actual configuration and an indication of a plurality of potential configurations which an offerer endpoint is capable of supporting. The method 210 further comprises generating and sending, at block 214, an answer message in SDP format, which answer message includes an indication of a selection of a configuration from the offered actual configuration or plurality of potential configurations.

Figure 4:
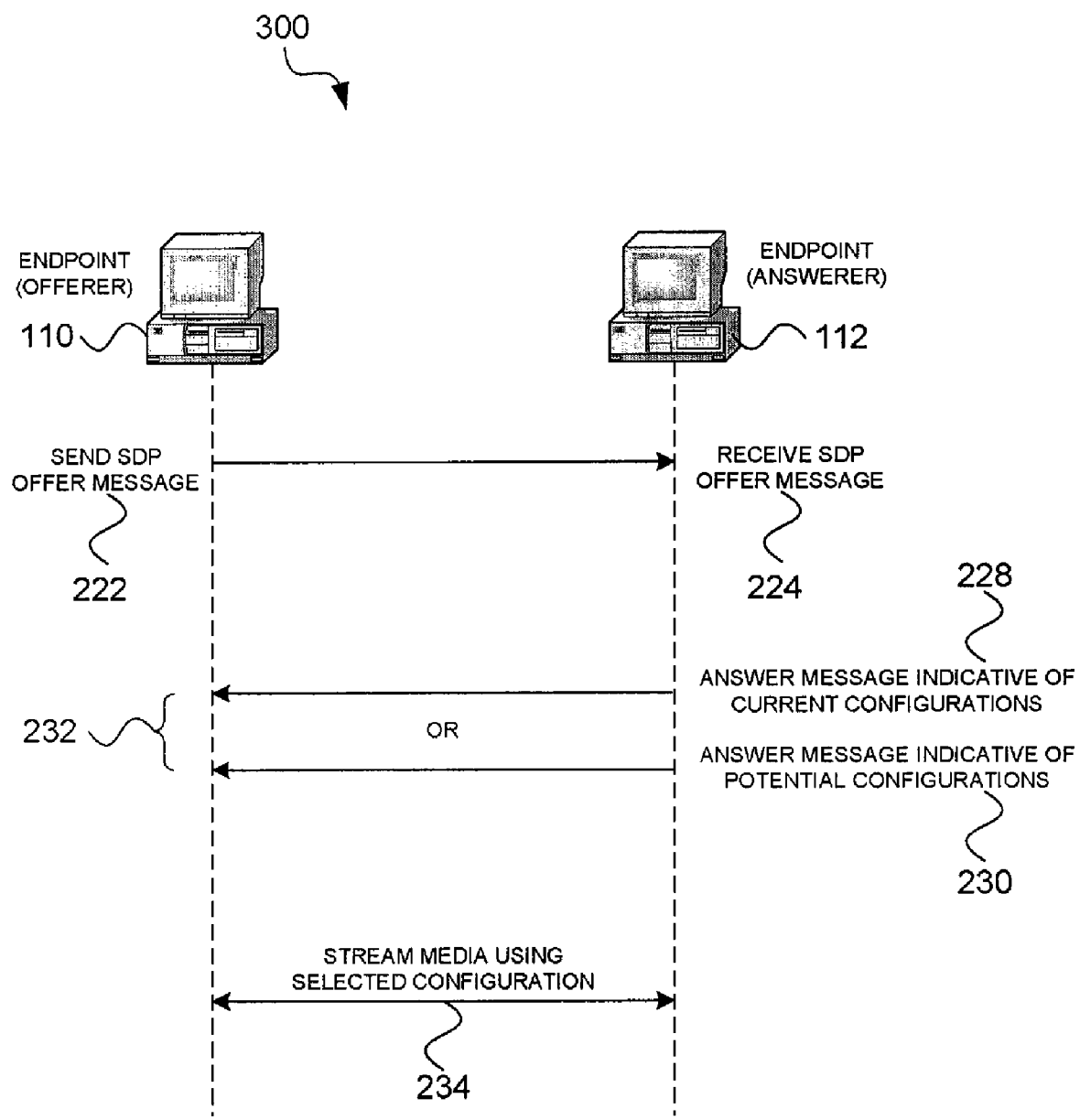
FIG. 4 shows, in an interaction diagram form, the method of FIG. 3*c*.

A further example embodiment is described with reference to FIG. 3c and FIG. 4. FIG. 3c shows a low-level flow diagram of a method 220, in accordance with an example embodiment, for SDP-based session negotiation, while FIG. 4 shows the method 220 in an interactive diagram format.

In accordance with an example embodiment, the SDP processing module 120 of the offerer endpoint 110 generates and sends (e.g. via the communication interface 122), at block 222, an offer message, in SDP format, the offer message comprising an indication of a plurality of potential configurations (or capabilities) which the offerer endpoint 110 is capable of supporting. The offer message may further include, in conventional fashion, one or more actual configurations which the offerer endpoint 110 is currently supporting.

Depending on the configuration of an endpoint, it may be able to support multiple configurations. Unlike the example embodiments described herein, in the prior art, if an endpoint indicated multiple configurations in the offer message, these multiple configurations would have to be actual configurations which the endpoint was currently using and thus the endpoint would have to commit to each of the configurations. This may be undesirable because, for example, while an endpoint may be able to use multiple configurations, it may not necessarily be able to or desire to use all the configurations at the same time. Thus, some endpoints can only use particular combinations of configurations.

In the example embodiment shown in FIG. 1 the offerer endpoint 110 may indicate the plurality of potential configurations by assigning a new attribute or value to an existing type of SDP identifier. It is to be understood that an SDP session description consists of a number of lines of text in the form: <type>=<value>, where <type> may be exactly one case significant character and <value> is structured text whose format depends on <type>. Thus, for example, using the existing "a" type or identifier (used to represent an attribute) and assigning various values, in accordance with an example embodiment, to the "a" type, for instance in the form "a=<value>", potential configurations may be indicated. The <value> field may include multiple values or attributes, for example separated by colons, commas, or white spaces. Further, the offer message may include SDP identifiers in accordance with SDP simple capability declaration ("simcap") as defined in RFC 3407 (for example "a=sqn <value>" and "a=cdsc <value>"). In a conventional fashion, the "m" type as well as other types (e.g. attributes) may still be used to indicate one or more actual configurations, for example in the form "m=<media> <port> . . . " possibly supplemented with additional types (e.g. existing attributes).

There may be additional values or attributes, in accordance with an example embodiment, assignable to the "a" type. For instance, to list transport protocols as potential configurations or capabilities supported by the offerer endpoint 110, the syntax "a=pcfg: <value>[<value> . . . ]" may provide the indication of potential configurations in the offer message by reference to transport protocol capability identifiers.

Further, the syntax "a=ctrpr <value>" may define how to list transport protocols as capabilities, "a=ctrad <value>" may define how to list transport addresses as capabilities, and "a=capar <value>" may define how to list attributes as capabilities. In an example embodiment, common for each of these is that one or more values can be assigned to each capability and furthermore that an identifier can be assigned to each of these values.

By way of example, an offer message in accordance with an example embodiment may read as follows:

v=0
o=-25678 753849 IN IP4 128.96.41.1
s=
c=IN IP4 128.96.41.1
t=0 0
m=audio 3456 RTP/AVP 0 18
a=sqn: 0
a=cdsc: 1 audio RTP/SAVP 0 4 18
a=ctrad: 1 IN IP4 128.96.41.1 3456
a=ctrad: 2 IN IP4 224.2.17.12/127 49170
a=ctrpr: 1 RTP/AVP
a=ctrpr: 2 RTP/AVPF
a=ctrpr: 3 RTP/SAVP a=ctrpr: 4 RTP/SAVPF
a=capar: 1 a=crypto: 1 AES_CM_128_HMAC_SHA1_32
   inline:NzB4d1BINUAvLEw6UzF3WSJ+
   PSdFcGdUJShpX1Zj2^20|1:32
a=pcfg: c=1|3 p=1,2 d=1
a=pcfg: c=1|3 p=3,4 d=1 a=1
a=pcfg: c=2 p=1 d=1,2

The attribute "a=pcfg:" may indicate that the offerer endpoint 110 is capable of using three potential configurations. The first potential configuration indicates that PCMU (the first simcap capability, which is payload type number 0) or G.729 (the third simcap capability, which is payload type number 18) can be supported with any of the profiles RTP/AVP or RTP/AVPF on the unicast address only. Similarly, the second potential configuration indicates that PCMU (the first simcap capability, which is payload type number 0) or G.729 (the third simcap capability, which is payload type number 18) can be supported with any of the profiles RTP/SAVP or RTP/SAVPF on the unicast address only and furthermore using the capability parameter attribute 1 (the crypto attribute which is providing the necessary keying material for use with either of the secure RTP profiles). The third potential configuration indicates that G.723 (payload type number 4) can be supported with the RTP/AVP profile only but on either the unicast or multicast address indicated.

The answerer endpoint 112 receives, at block 224, the offer message indicative of the potential configurations. Depending on the configuration of the answerer endpoint 112, it may or may not be operable to interpret fully, at block 226, the offer message in accordance with an example embodiment.

If the answerer endpoint 112 is an endpoint in accordance with the prior art, the answerer endpoint 112 may not be operable to interpret the new attributes (e.g. "a=ctrpr . . . ", etc.). In such a case, the SDP processing module 120 generates and sends, at block 228, an SDP answer message indicating a selection of one of the actual configurations the offerer endpoint 110 is currently using as indicated in the "m= . . . " and "c= . . . " lines. Thus, in an example embodiment, if an endpoint does not support the modified SDP functionality, the new attributes are ignored as is the case with prior art SDP and the endpoint then operates in a conventional way. In an example embodiment of the present disclosure, encoding is done utilizing an SDP attribute. Accordingly, the modified SDP methodology described herein may be fully backwards compatible as an endpoint device using SDP ignores attributes that it cannot understand.

On the other hand, if the answerer endpoint 112 is an endpoint in accordance with an example embodiment, the answerer endpoint 112 generates and sends, at block 230, an SDP answer message indicative of the selection of one or more of the potential configurations. Thus, in an example embodiment, the offer/answer model (as defined in RFC 3264) may be extended to include a greater measure of capability negotiation.

For instance, the answer message may read as follows:
v=0
o=-24351 621814 IN IP4 128.96.41.2
s=
c=IN IP4 128.96.41.2
t=0 0
m=audio 4567 RTP/AVPF 0
a=acfg: c=1 p=2 d=1

The above answer message indicates that the answerer endpoint 112 selected a configuration (based on one of the plurality of potential configurations) consisting of simcap capability 1 (PCMU), transport protocol capability 2 (RTP/AVPF), and transport address capability 1 (IPv4 address 128.96.41.1 and port 3456). Thus, unlike the prior art, example embodiments described herein enhance SDP to allow capability negotiation between two endpoint devices.

The offer endpoint 110 receives, at block 232, the answer message indicative of the selection made by the answerer endpoint 112. Media may then be sent back and forth between the endpoints 110, 112 using the selected configuration.

In example embodiments the method and apparatus described herein, the capability declaration mechanism may be defined by simcap [RFC3407]. In an example embodiment new attributes may thus be provided that are used in combination with SDP attributes. Examples of the new attributes may include a new attribute ("a=ctrpr") that defines how to list transport protocols as capabilities and, in an example embodiment, assign an identifier to each transport protocol capability, a new attribute ("a=ctrad") that defines how to list transport addresses as capabilities and assign an identifier to each transport address capability, and a new attribute ("a=capar") that defines how to list attributes as capabilities and assign an identifier to each attribute capability. Further, a new attribute ("a=pcfg") that lists the potential configurations, supported by the entity that generated the SDP may be provided. This may, for example, be done by reference to the simcap capabilities from the SDP in question, and optionally one or more of the transport protocol, transport address, and attribute capabilities. A new attribute ("a=acfg") may be provided to be used in an answer SDP. The attribute may identify which of the potential configurations from an offer SDP were used as actual configurations to form the answer SDP. This may be done by listing the potential configurations that were used from the offer SDP.

Extensions to the offer/answer model may be provided that allow for potential configurations to be included in an offer, where they constitute offers that may be accepted by the answerer instead of the actual configuration(s) included in the "m=" and other relevant line(s).

The methodology described above is described by way of a further example with reference to an offer/answer exchange where "Alice" sends an offer to "Bob":

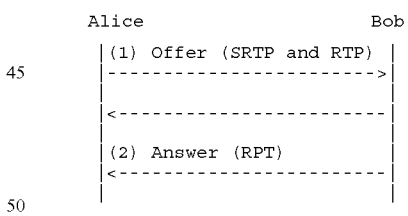

Alice's offer in this example embodiment includes RTP and SRTP as alternatives, with SRTP being, for example, the preferred one:
v=0
o=-25678 753849 IN IP4 128.96.41.1
s=
c=IN IP4 128.96.41.1
t=0 0
m=audio 3456 RTP/SAVP 0 18
a=crypto:1 AES_CM_128_HMAC_SHA1_32
   inline:NzB4d1BINUAvLEw6UzF3WSJ+
   PSdFcGdUJShpX1Zj|2^20|1:32
a=sqn: 0
a=cdsc: 1 audio RTP/SAVP 0 18
a=cdsc: 3 audio RTP/AVP 0 18
a=pcfg: c=1,2|3,4

In the example embodiment, the "m=" line indicates that Alice is offering to use secure RTP with PCMU or G.729. The "crypto" attribute provides the keying material using SDP security descriptions [RFC 4568]. The simcap capability declaration is provided by the "a=sqn" and "a=cdsc" attributes as defined in [RFC3407]. The capabilities indicate that PCMU and G.729 are supported with either secure RTP (preferred) or RTP. The new "a=pcfg" attribute in accordance with an example embodiment provides the potential configurations included in the offer by reference to the simcap capability declarations. Two alternatives are provided in the example; the first one using capabilities 1 and 2 (PCMU and G.729 under the RTP/SAVP profile (secure RTP)), and the second one using capabilities 3 and 4 (PCMU and G.729 under the RTP/AVP profile).

Bob is shown to receive the SDP offer from Alice. Bob supports, for example, RTP, but not SRTP, and hence he accepts the potential configuration for RTP provided by Alice:

v=0
o=−24351 621814 IN IP4 128.96.41.2
s=
c=IN IP4 128.96.41.2
t=0 0
m=audio 4567 RTP/AVP 0 18
a=acfg: c=3,4

Bob is shown to include the new "a=acfg" attribute in the answer to inform Alice that he based his answer on an offer containing the potential configuration with capabilities 3 and 4 from the offer SDP (PCMU and G.729 under the RTP/AVP profile). In an example embodiment, this in turn implies that absence of an "a=crypto" attribute in the answer (to convey SRTP keying material) does not constitute an error.

Example Attribute Definitions
Example Transport Protocol Capability Attribute

Transport Protocols can be expressed as capabilities by use of a new Transport Protocol Capability attribute (e.g., "a=ctrpr") that may be defined as follows:

a=ctrpr: <trpr-cap-num> <proto> where <trpr-cap-num> is an integer between 1 and 255 (both included) used to number the transport address capability for later reference, and <proto> is defined as in the SDP "m=" line.

The "ctrpr" attribute may be a media-level only attribute. In an example embodiment each occurrence of the attribute within a given media description ("m=" line) must use a different value of <trpr-cap-num>, with the first one for example being 1, the second one for example being 2, etc. The <trpr-cap-num> values provided may be independent of similar <cap-num> values provided for other attributes, and they thus form a separate name-space for transport protocol capabilities.

Examples of the "a=ctrpr" attribute are "a=ctrpr: 1 RTP/AVP" and "a=ctrpr: 2 RTP/AVPF". The first example provides a capability for the "RTP/AVP" profile defined in [RFC3551] and the second example provides a capability for the RTP with RTCP-Based Feedback profile defined in [RFC4585]. Having the aforementioned as a separate capability indication may provide significant message size reduction when negotiating alternative profiles (of which there can be many).

Example Transport Address Capability Attribute

Transport addresses can be expressed as capabilities by use of a new Transport Address Capability attribute ("a=ctrad") that may for example be defined as follows:

a=ctrad: <trad-cap-num> <network type> <address type> <connection address> <port>*<port> where <trad-cap-num> is an integer between 1 and 255 (both included) used to number the transport address capability for later reference, <network type>, <address type> and <connection address> are defined as in the SDP "c=" line, and the first occurrence of <port> is as defined in the SDP "m=" line. Additional <port> occurrences may be present; the only currently well-defined semantics associated with this is when one additional port is present for RTP-based media streams. In that case, that second port field may take on the meaning of the "a=rtcp" attribute defined in [RFC3605].

In an example embodiment, the "ctrad" attribute is a media-level only attribute. Each occurrence of the attribute within a given media description ("m=" line) should use a different value of <trad-cap-num>, with the first one being 1, the second one being 2, etc. The <trad-cap-num> values provided may be independent of similar <cap-num> values provided for other attributes and may thus form a separate name-space for transport address capabilities.

An example of the "a=ctrad" attribute may be:

a=ctrad: 1 IN IP4 128.96.41.1 3456
a=ctrad: 2 IN IP4 224.2.17.12/127 49170

The first example attribute may provide a unicast address on port 3456, whereas the second may provide a multicast address with a time to live of 127 on port 49170.

Example Attribute Parameter Capability Attribute

Attribute values can be expressed as capabilities by use of a new Attribute Parameter Capability attribute ("a=capar") similar to the "a=cpar" attribute defined by simcap, except with a handle that enables referencing it. The parameter may for example be defined as follows:

a=capar: <att-cap-num> <att-par> where <att-cap-num> is an integer between 1 and 255 (both included) used to number the attribute parameter capability and <att-par> is an attribute ("a=") in its full '<type>=<value>' form (see [RFC4566])

In an example embodiment, the "capar" attribute can be provided at the session level or the media level. Each occurrence of the attribute should use a different value of <app-cap-num>, with the first one being 1, the second one being 2, etc. The <att-cap-num> values provided may be independent of similar <cap-num> values provided for other attributes and may thus form form a separate name-space for attribute parameter capabilities.

An example of the "capar" attribute may be:

a=capar: 1 a=ptime: 20
a=capar: 2 a=ptime: 30
a=capar: 3 a=key-mgmt: mikey
QAFgMOXflABAAAAAAAAAAAAAAsAy
ONQ6gAAAAAGEEoo2pee4hp2UaDX8ZE22YwKAAAPZG9uYWxkQGR1Y2su
Y29tAQAAAAAAAQAkOJKpgaVkDaawi9whVBtBtOKZ14ymNuu62+Nv3
ozPLyg wK/GbAV9iemnGUIZ19fWQUOSrzKTAv9zV
a=capar: 4 a=crypto:1 AES_CM_128_HMAC_SHA1_
   32
inline:NzB4d1BINUAvLEw6UzF3WSJ+
   PSdFcGdUJShpX1Z.j|2^20|1:32

The first two may provide attribute values for the ptime attribute. The third may provide SRTP parameters by using MIKEY with the key-mgmt attribute [RFC4567]. The fourth may provide SRTP parameters by use of security descriptions with the crypto attribute [RFC4568].

Example Potential Configuration Attribute

In an example embodiment, potential configurations can be expressed by use of a new Potential Configuration Attribute ("a=pcfg") that may, for example, be defined as follows:

a=pcfg: <simcap-capabilities>
   [<transport-protocol-capabilities]
   [<transport-address-capabilities>]

[<attribute-parameter-capabilities>]

The example potential configuration attribute may include one or more sets of simcap-capabilities. A list of possible transport address capabilities, transport protocol capabilities as well as attribute parameter capabilities can optionally be included as well. Together, these values may define a set of potential configurations.

<simcap-capabilities> is defined by the following Augmented Backus-Naur Form (ABNF) grammar:
    simcap-capabilities="c=" cap-list*("|" cap-list)
    cap-list=cap-num*("," cap-num)
    cap-num=1*3DIGIT; defined in [RFC4234]

In an example embodiment, each capability list is a comma-separated list of simcap capability numbers where cap-num refers to simcap capability numbers and hence should be between 1 and 255 (both included). Alternative potential simcap configurations are separated by a vertical bar ("J"), or any other separator.

<transport-protocol-capabilities> may be defined by the following ABNF:
    transport-protocol-capabilities="p=" trpr-cap-list
    trpr-cap-list=trpr-cap-num*("," trpr-cap-num)
    trpr-cap-num=1*3DIGIT; defined in [RFC4234]

The trpr-cap-num may refer to transport protocol capability numbers defined above and hence should be between 1 and 255 (both included). Multiple transport protocol capabilities may be provided in a comma-separated list. When transport protocol capabilities are not included, the transport protocol information from the media description ("m=" line) may be used.

<transport-address-capabilities> may be defined by the following ABNF:
    transport-address-capabilities="d=" trad-cap-list
    trad-cap-list=trad-cap-num*("," trad-cap-num)
    trad-cap-num=1*3DIGIT; defined in [RFC4234]

The trad-cap-num refers to transport address capability numbers defined above and hence should be between 1 and 255 (both included). Multiple transport address capabilities are provided in a comma-separated list. When transport address capabilities are not included, the transport address information from the media description ("m=" line and corresponding "c=" line) may be used.

<attribute-parameter-capabilities> may be defined by the following ABNF:
    attribute-parameter-capabilities="a=" capar-cap-list*("|" capar-cap-list)
    capar-cap-list=att-cap-num*("," att-cap-num)
    att-cap-num=1*3DIGIT; defined in [RFC4234]

In an example embodiment, each attribute parameter capability list may be a comma-separated list of attribute capability parameter numbers where "att-cap-num" refers to attribute parameter capability numbers defined above and hence should be between 1 and 255 (both included). Alternative attribute parameter capabilities are separated by a vertical bar ("|"), or any other separator. The alternatives may be ordered by preference.

The potential configuration ("a=pcfg") attribute is a media-level only attribute. Each occurrence of the attribute within a given media description ("m=" line) defines a set of potential configurations that can be used for that media description.

Below, is provided an example of the "a=pcfg" attribute in a complete media description in order to properly indicate the supporting attributes:
    v=0
    o=-25678 753849 IN IP4 128.96.41.1
    s=
    c=IN IP4 128.96.41.1
    t=0 0
    m=audio 3456 RTP/AVP 0 18
    a=sqn: 0
    a=cdsc: 1 audio RTP/SAVP 0 4 18
    a=ctrad: 1 IN IP4 128.96.41.1 3456
    a=ctrad: 2 IN IP4 224.2.17.12/127 49170
    a=ctrpr: 1 RTP/AVP
    a=ctrpr: 2 RTP/AVPF
    a=ctrpr: 3 RTP/SAVP
    a=ctrpr: 4 RTP/SAVPF
    a=capar: 1 a=crypto:1 AES_CM_128_HMAC_SHA1_32
    inline: NzB4d1BINUAvLEw6UzF 3WSJ+PSdFcGdUJShpX1Zj|2^20|1:32
    a=pcfg: c=1|3 p=1,2 d=1
    a=pcfg: c=1|3 p=3,4 d=1 a=1
    a=pcfg: c=2 p=1 d=1,2

The above example embodiment provides three potential configurations. The first potential configuration indicates that PCMU (the first simcap capability, which is payload type number 0) or G.729 (the third simcap capability, which is payload type number 18) can be supported with any of the profiles RTP/AVP or RTP/AVPF on the unicast address only. Similarly, the second potential configuration indicates that PCMU (the first simcap capability, which is payload type number 0) or G.729 (the third simcap capability, which is payload type number 18) can be supported with any of the profiles RTP/SAVP or RTP/SAVPF on the unicast address only and furthermore using the capability paramater attribute 1 (the crypto attribute which is providing the necessary keying material for use with either of the secure RTP profiles). The third potential configuration indicates that G.723 (payload type number 4) can be supported with the RTP/AVP profile only but on either the unicast or multicast address indicated.

Example Actual Configuration Attribute

The actual configuration attribute may identify which of the potential configurations from an offer SDP were used as actual configurations in an answer SDP. This may be done by reference to the simcap capabilities, and the transport protocol, transport address and attribute parameter (if included) capabilities from the offer that were actually used by the answerer in his offer/answer procedure.

The Actual Configuration Attribute ("a=acfg") may for example be defined as follows:
    a=acfg: <simcap-capability-list>
        [<transport-protocol-capability]
        [<transport-address-capability>]
        [<attribute-parameter-capabilities>]
        <simcap-capabily-list> may be defined by the following ABNF:
    simcap-capabily-list="c=" cap-list
    cap-list=cap-num*("," cap-num)
    cap-num=1*3DIGIT; defined in [RFC4234]

Each capability list may be a comma-separated list of simcap capability numbers where cap-num refers to simcap capability numbers and hence, in an example embodiment, must be between 1 and 255 (both included).

<transport-protocol-capabilities> may be defined by the following ABNF:
    transport-protocol-capability="p=" trpr-cap-num
    trpr-cap-num=1*3DIGIT; defined in [RFC4234]

The trpr-cap-num may refer to transport protocol capability numbers defined above and hence should be between 1 and 255 (both included).

When a transport protocol capability is not included, the transport protocol information from the media description ("m=" line) in the offer is being used.

<transport-address-capability> may be defined by the following ABNF:

transport-address-capability="a=" trad-cap-num
trad-cap-num=1*3DIGIT; defined in [RFC4234]

The trad-cap-num may refer to transport address capability numbers defined above and hence should be between 1 and 255 (both included).

When a transport address capability is not included, the transport address information from the media description ("m=" line and corresponding "c=" line) in the corresponding offer is being used.

<attribute-parameter-capabilities> may be defined by the following ABNF:

attribute-parameter-capabilities="a=" capar-cap-list
capar-cap-list=att-cap-num*("," att-cap-num)
att-cap-num=1*3DIGIT; defined in [RFC4234]

Each attribute parameter capability list is a comma-separated list of attribute capability parameter numbers where att-cap-num refers to attribute parameter capability numbers defined above and hence should be between 1 and 255 (both included).

In an example embodiment, the actual configuration ("a=acfg") attribute is a media-level only attribute. In an example embodiment there should not be more than one occurrence of an actual configuration attribute within a given media description.

Below, we provide an example of the "a=acfg" attribute (building on the previous example with the potential configuration attribute):

v=0
o=−24351 621814 IN IP4 128.96.41.2
s=
c=IN IP4 128.96.41.2
t=0 0
m=audio 4567 RTP/AVPF 0
a=acfg: c=1 p=2 d=1

In the example embodiment it indicates that the answerer used an offer consisting of simcap capability 1 (PCMU), transport protocol capability 2 (RTP/AVPF), and transport address capability 1 (IPv4 address 128.96.41.1 and port 3456).

Example Offer/Answer Model Extensions

Example extensions to the offer/answer model defined in [RFC3264] are provided to allow for potential configurations to be included in an offer, where they constitute offers that may be accepted by the answerer instead of the actual configuration(s) included in the "m=" line(s).

Example Generation of the Initial Offer

An offerer that wants to use capability negotiation extensions defined in an example embodiment should include the following in the offer:

one or more simcap capability descriptions (as defined in [RFC3407]) for each of the capabilities;
optionally, one or more transport protocol capability attributes (if one or more alternative transport protocols is to be negotiated);
optionally, one or more transport address capability attributes (if one or more alternative transport addresses is to be negotiated);
optionally, one or more attribute parameter capability attributes (if one or more alternative attribute parameter values is to be negotiated); and
one or more potential configuration attributes (as described by way of example above) which define the potential configurations supported by the offerer.

Each of the potential configurations listed may constitute an alternative offer which may be used to negotiate and establish the session. In an example embodiment, the current actual configuration is included in the "m=" and other relevant lines (as defined by [RFC3264]).

Example Generation of the Answer

In an example embodiment, when the answerer receives an offer with one or more valid potential configuration information attributes present, it may use any of the potential configurations as an alternative offer. A potential configuration information attribute may be valid if all of the capabilities (simcap, transport protocol, transport addresses and attribute parameters) it references are present and valid themselves. The actual configuration may be contained in the media description's "m=" and other relevant lines. The answerer can send media to the offerer in accordance with the actual configuration, however if it chooses to use one of the alternative potential configurations, media sent to the offerer may be discarded by the offerer until the answer is received.

In an example embodiment, if the answerer chooses to accept one of the alternative potential configurations instead of the actual configuration, the answerer should generate an answer as if the offer contained that potential configuration instead of the actual configuration included. The answerer should also include an actual configuration attribute in the answer that identifies the potential configuration from the offer used by the answerer.

Further Example Offerer Processing of the Answer

In an example embodiment, when the offerer included potential configurations for a media stream, it should examine the answer for the presence of an actual configuration attribute for each such media stream. If the attribute is missing, offerer processing of the answer should proceed as defined by [RFC3264]. If the attribute is present, processing may continue as follows. The actual configuration attribute specifies which of the potential configurations was used by the answerer to generate the answer. The offerer should now process the answer as if the offer had contained the potential configuration indicated as the actual configuration in the media description ("m=" line) and other relevant lines in the offer.

Example Modification of a Session

Potential configurations may be included in subsequent offers as defined in [RFC3264, Section 8]. The procedure for doing so may be similar to that described above with the answer including an indication of the actual configuration used by the answerer.

Example Functionality Provided by Some Embodiments

An example embodiment, utilizing the methodology described herein, may indicate and negotiate alternative media formats on a per media stream basis. For example, many existing implementations support multiple codecs, but only one at a time. Changes between codecs cannot be done on-the-fly, e.g. when receiving a simple RTP payload type change. Example embodiments described herein allow changes in codecs on-the-fly.

An example embodiment, utilizing the methodology described herein, may indicate and negotiate alternative attribute values ("a=") on a per media stream basis. For example, T.38 defines new attributes that may need to be conveyed as part of a capability.

An example embodiment, utilizing the methodology described herein, may indicate and negotiate alternative media format parameter values ("a=fmtp") per media format on a per media stream basis. For example, a media format (codec) indicated as an alternative capability may include fmtp parameters.

An example embodiment, utilizing the methodology described herein, may indicate and negotiate alternative transport protocols, e.g. different RTP profiles, on a per media stream basis. For example, "RTP/AVP" and "RTP/SAVP" may be alternatives.

An example embodiment, utilizing the methodology described herein, may indicate and negotiate alternative transport protocol and media type combinations on a per media stream basis. For example, an entity may support a fax call using either T.38 fax relay ("m=image <port> udptl t38") or PCMU ("m=audio <port> RTP/AVP 0").

An example embodiment, utilizing the methodology described herein, may specify unicast and multicast addresses as alternatives.

An example embodiment, utilizing the methodology described herein, may specify IPv4 and IPv6 addresses as alternatives.

An example embodiment, utilizing the methodology described herein, is backwards compatible for at least SIP and RTSP. In one example embodiment, the methodology described herein is completely transparent to entities that do not support it, without the need for any further signaling.

An example embodiment, utilizing the methodology described herein, may be backwards compatible for Megaco and MGCP and/or it may interwork it with Megaco and MGCP without any additional signaling. For example, if a media gateway controller (MGC) uses SIP to communicate with peers, and the MGC uses Megaco or MGCP to control a media gateway, may translate between the mechanism and normal SDP.

An example embodiment, utilizing the methodology described herein, may work within the context of the offer/answer model [RFC3264]. For example, the methodology described herein may negotiate alternatives within a single round-trip.

In an example embodiment, the offer/answer model may require the offerer to be able to receive media for any media streams listed as either "recvonly" or "sendrecv" in an offer, as soon as that offer is generated. The mechanism may preserve this capability for all actual configurations included in an offer.

In an example embodiment, inclusion of potential configurations (alternative capabilities) in the offer is enabled—the answer would then indicate which, if any of these potential configurations were accepted. The offerer may not be required to process media for a specific potential configuration until the offerer receives an answer showing that potential configuration was accepted.

In an example embodiment, the SDP processing module 120 (or any other module in an endpoint device) is configured to identify in the offer message an attribute that identifies attribute parameter capabilities of the offerer device. Thereafter, one or more attribute parameter values may be selected from the attribute parameter capabilities. The selected attribute parameter values may be identified in the answer message.

In an example embodiment, the example method and device described herein may identify in the offer message an attribute that identifies media format capabilities of the offerer device, select one or more media formats from the attribute, and identify the selected media format(s) in the answer message. Thus, in an example embodiment, the simcap capabilities may be utilized to pick the media formats (codecs).

An example embodiment is configured to work in the presence of SIP forking.

Figure 5:
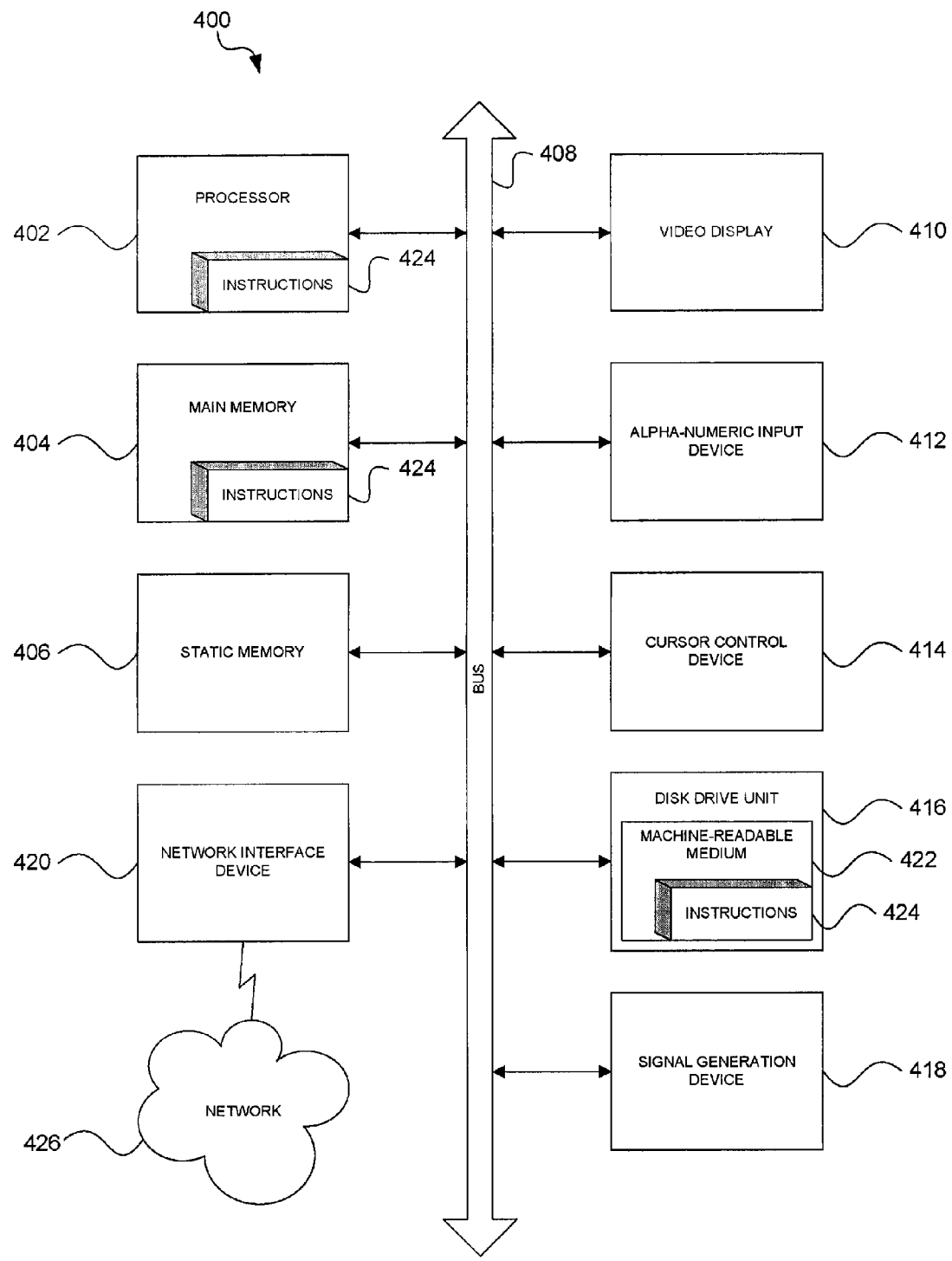
FIG. 5 shows a diagrammatic representation of machine in the example form of a computer system within which a set of instructions, for causing the machine to perform any one or more of the methodologies discussed herein, may be executed.

FIG. 5 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP).

While the machine-readable medium 422 is shown in an example embodiment to be a single medium, the term "machine-readable medium" should be taken to include a single medium or multiple media (e.g., a centralized or distributed database, and or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present embodiment, or that is capable of storing, encoding or carrying data structures utilized by or associated with such a set of instructions. The term "machine-readable medium" shall accordingly be taken to include, but not be limited to, solid-state memories, optical media and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The example embodiments may provide a number of advantages. Potential configurations, or particular combinations thereof, can be negotiated. This may include, for example, negotiating alternate attributes or configurations on a per media stream basis, negotiating alternate transport protocols, specifying unicast and multicast addresses as alternatives and specifying IPv4 and IPv6 addresses as alternatives. Endpoints which use a method in accordance with an example embodiment may be totally backwardly compatible with endpoints in accordance with the prior art. Further, the capability negotiation may occur within a single round-trip and the size of the offer message and answer message may be reasonably efficient.

The invention claimed is:

1. A method which comprises:
    initiating at an offerer device an offer message in Session Description Protocol (SDP) format;
    including in the offer message an indication of a plurality of potential configurations which the offerer device is capable of supporting, the indication of the plurality of potential configurations comprising assigning a new attribute to an existing type of SDP identifier, wherein the new attribute is not an existing attribute, and wherein the new attribute is not a value assignable to an attribute or to an existing type of SDP identifier; and
    sending the offer message to an answerer device to allow capability negotiation between the offerer device and the answerer device.

2. The method of claim 1, wherein the offer message including the indication of the plurality of potential configurations is backwards compatible with an SDP offer message.

3. The method of claim 1, which comprises receiving an answer message from the answerer device indicative of a selection of at least one configuration from the plurality of potential configurations and thereafter sending and/or receiving media using the selected configuration.

4. The method of claim 1, which comprises including an attribute in the offer message that identifies transport protocols capabilities of the offerer device.

5. The method of claim 1, which comprises including an attribute that identifies transport addresses capabilities of the offerer device.

6. The method of claim 1, which comprises including an attribute that identifies attribute parameter capabilities of the offerer device.

7. The method of claim 1, which comprises including an attribute that identifies potential configurations supported by the offerer device, the attribute identifying at least one or more of simcap-capabilities.

8. The method of claim 1, which comprises receiving an answer message from the answerer device which includes an attribute that identifies which of the potential configurations identified in the offer message were used as actual configurations to form an answer SDP message.

9. A method which comprises:
    receiving an offer message from an offerer device in Session Description Protocol (SDP) format, the offer message including an indication of a plurality of potential configurations which the offerer device is capable of supporting, the indication of the selection of at least one configuration comprising assigning a new attribute to an existing type of SDP identifier, wherein the new attribute is not an existing attribute, and wherein the new attribute is not a value assignable to an attribute or to an existing type of SDP identifier;
    generating an answer message in Session Description Protocol (SDP) format, the answer message including an indication of a selection of at least one configuration from the plurality of potential configurations; and
    sending the answer message to the offerer device.

10. The method of claim 9, which comprises:
    identifying in the offer message an attribute that identifies transport protocols capabilities of the offerer device;
    selecting a transport protocol from the transport protocols capabilities; and
    identifying the selected transport protocol in the answer message.

11. The method of claim 9, which comprises:
    identifying in the offer message an attribute that identifies transport addresses capabilities of the offerer device;
    selecting a transport address capability from the transport address capabilities; and
    identifying the selected transport address in the answer message.

12. The method of claim 9, which comprises:
    identifying in the offer message an attribute that identifies attribute parameter capabilities of the offerer device;
    selecting an attribute parameter value from the attribute parameter capabilities; and
    identifying the selected attribute value in the answer message.

13. The method of claim 9, which comprises:
    identifying in the offer message an attribute that identifies media format capabilities of the offerer device;
    selecting one or more media formats from the attribute; and
    identifying the selected media format(s) in the answer message.

14. The method of claim 9, which comprises:
    identifying in the offer message an attribute that identifies potential configurations of the offerer device;
    selecting a configuration from the potential configurations; and
    identifying the selected configuration in the answer message.

15. A device comprising:
    a SDP processing module to initiate an offer message in Session Description Protocol (SDP) format and include in the offer message an indication of a plurality of potential configurations which the device is capable of supporting, by assigning a new attribute to an existing type of SDP identifier, wherein the new attribute is not an existing attribute, and wherein the new attribute is not a value assignable to an attribute or to an existing type of SDP identifier; and
    a communication module to send the offer message to an answerer device to allow capability negotiation between the device and the answerer device.

16. The device of claim 15, wherein the communication module is configured:
    to receive an answer message from the answerer device indicative of a selection of at least one configuration from the plurality of potential configurations; and
    stream media using the selected configuration.

17. The device of claim 15, wherein the SDP processing module is configured to include an attribute in the offer message that identifies transport protocols capabilities of the device.

18. The device of claim 15, wherein the SDP processing module is configured to include an attribute in the offer message that identifies transport addresses capabilities of the device.

19. The device of claim 15, wherein the SDP processing module is configured to include an attribute in the offer message that identifies attribute parameter capabilities of the device.

20. The device of claim 15, wherein the SDP processing module is configured to include an attribute in the offer message that identifies potential configurations supported by the device, the attribute identifying one or more of simcap-capabilities.

21. The device of claim 15, wherein:
the communication module is configured to receive an offer message from an offerer device; and
provide an answer message including an attribute that identifies which of the potential configurations identified in the offer message received by the device were used as actual configurations to form the answer message.

22. The device of claim 15, wherein:
the communication module is configured to receive an offer message from an offerer device in Session Description Protocol (SDP) format, the offer message including an indication of a plurality of potential configurations which the offerer device is capable of supporting;
the SDP processing module is configured to generate an answer message in Session Description Protocol (SDP) format, the answer message including an indication of a selection of at least one configuration from the plurality of potential configurations; and
the communication module is configured to send an answer message to the offerer device.

23. The device of claim 22, wherein the SDP processing module is configured to assign a new attribute or value to an existing type of SDP identifier.

24. The device of claim 22, wherein the SDP processing module is configured to:
identify in the offer message an attribute that identifies transport protocols capabilities of the offerer device;
select a transport protocol from the transport protocols capabilities; and
identify the selected transport protocol in the answer message.

25. The device of claim 22, wherein the SDP processing module is configured to:
identify in the offer message an attribute that identifies transport addresses capabilities of the offerer device;
select a transport address capability from the transport address capabilities; and
identify the selected transport address in the answer message.

26. The device of claim 22, wherein the SDP processing module is configured to:
identify in the offer message an attribute that identifies attribute parameter capabilities of the offerer device;
select one or more attribute parameter values from the attribute parameter capabilities; and
identify the selected attribute parameter values in the answer message.

27. The device of claim 22, wherein the SDP processing module is configured to:
identify in the offer message an attribute that identifies potential configurations of the offerer device;
select a configuration from the identified potential configurations; and
identify the selected configuration in the answer message.

28. A machine-readable medium embodying instructions which, when executed by a machine cause the machine to:
initiate at an offerer endpoint an offer message in Session Description Protocol (SDP) format;
include in the offer message an indication of a plurality of potential configurations which the offerer endpoint is capable of supporting, the indication of the plurality of potential configurations comprising assigning a new attribute to an existing type of SDP identifier, wherein the new attribute is not an existing attribute, and wherein the new attribute is not a value assignable to an attribute or to an existing type of SDP identifier; and
send the offer message to an answerer endpoint to allow capability negotiation between the offerer endpoint and the answerer endpoint.

29. A device comprising:
means for initiating at an offerer endpoint an offer message in Session Description Protocol (SDP) format;
means for including in the offer message an indication of a plurality of potential configurations which the offerer endpoint is capable of supporting, the indication of the plurality of potential configurations comprising assigning a new attribute to an existing type of SDP identifier, wherein the new attribute is not an existing attribute, and wherein the new attribute is not a value assignable to an attribute or to an existing type of SDP identifier; and
means for sending the offer message to an answerer endpoint to allow capability negotiation between the offerer endpoint and the answerer endpoint.

* * * * *